(12) United States Patent
Kalra et al.

(10) Patent No.: US 8,639,299 B2
(45) Date of Patent: Jan. 28, 2014

(54) SMARTPHONE WITH DETACHABLE INPUT AND OUTPUT (I/O) COMPONENTS (DIOC)

(75) Inventors: Sumit Kalra, Bikaner (IN); Chinmoy Mukherjee, Bangalore (IN); Rajarathnam Nallusamy, Thuraiyur Taluk (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/425,875

(22) Filed: Mar. 21, 2012

(65) Prior Publication Data
US 2013/0143540 A1   Jun. 6, 2013

(30) Foreign Application Priority Data

Dec. 5, 2011   (IN) ............................ 4195/CHE/2011

(51) Int. Cl.
| H04M 1/00 | (2006.01) |
| H04M 3/42 | (2006.01) |
| H04B 7/00 | (2006.01) |
| H04M 1/56 | (2006.01) |

(52) U.S. Cl.
USPC ...... 455/567; 455/416; 455/518; 379/142.01; 379/142.07

(58) Field of Classification Search
USPC ................. 455/410, 411, 418–420, 518, 566
See application file for complete search history.

(56) References Cited

U.S. PATENT DOCUMENTS

| 5,392,462 A * | 2/1995 | Komaki ...................... 455/552.1 |
| 6,317,491 B1 * | 11/2001 | Chang et al. ............. 379/142.01 |
| 2003/0157929 A1 * | 8/2003 | Janssen et al. ................. 455/416 |
| 2005/0136839 A1 * | 6/2005 | Seshadri et al. ............. 455/41.2 |

* cited by examiner

*Primary Examiner* — Olumide T Ajibade Akonai
*Assistant Examiner* — Erica Navar
(74) *Attorney, Agent, or Firm* — Marc S. Kaufman; Stephen M. Hertzler; Reed Smith LLP

(57) ABSTRACT

Embodiments of the present invention provide a mobile device comprising a core phone with a detachable primary device. The core phone transfers an incoming call alert to the detached primary device by synchronizing the display frame buffer of the core phone with the display frame buffer associated with the detached primary device. A plurality of remote secondary devices can be paired with the core phone on request by said secondary devices to transfer an incoming call alert to said plurality of secondary devices and establish a connection after authorization with said detached primary device. The detachable primary device is usable by pairing with the core phone when the core phone is not used directly but remains in the vicinity. Important data in the primary device is synchronized with the core phone to avoid data loss when the primary device is accidentally dropped or lost or damaged.

8 Claims, 10 Drawing Sheets

SMARTPHONE WITH DETACHABLE INPUT AND OUTPUT (I/O) COMPONENTS (DIOC)

RELATED APPLICATION DATA

This application claims priority to Indian Patent Application No. 4195/CHE/2011, filed Dec. 5, 2011, which is hereby incorporated by reference in its entirety.

BACKGROUND

The present invention generally relates to a mobile device and more particularly to a mobile device having a core phone and detachable primary device.

A mobile phone may contain contact details and data that are of high importance and value which are collected over the years. The contact details are not backed up or synchronized frequently, even though a mobile device is more likely to be damaged or lost than the devices that are stationary, and stored indoors. Moreover the mobile phones are nowadays used for browsing the internet, hence increasing the chances of mobile phone being damaged, dropped or lost etc. If user accidentally drops his/her cell phone in places like bathroom. He/she loses his/her contact details as well as other important data stored in the mobile phone. To avoid the loss of important data when the mobile phones are lost, at present mobile phone users back up their contacts or address books from their smart phones. The contact information's are stored in multiple places such as PCs, laptops, smart phones, e-mails and in social networks etc. As a result most of them relay on the remote access to the contact or address book information.

Currently, touch screens are integral part of the mobile phone. At present mobile phone user has to purchase touch screen and the mobile phone as a single unit. More over there is variety of environmental factors that could potentially impact ones optimal choice of touch technology. Moderate temperature changes do not have any impact on touch screen. In fact, extreme temperature changes have more impact on the touch electronics. Hence there is a need to overcome the consequences of temperatures changes on the smart phone touch screen. Accordingly, there is a need to overcome the above problems.

SUMMARY OF THE INVENTION

Embodiments of the present invention provide a mobile device comprising a core phone with a detachable primary device. The core phone includes a display unit, speaker, microphone, battery, microprocessor, memory, standard radio and wireless access point. The primary device includes a touch screen, speaker, microphone, battery, memory, microprocessor and a wireless radio. The primary device once detached from core phone is authenticated for communicating with said core phone through a wireless communication link. The core phone transfers an incoming call alert to the detached primary device by synchronizing the display frame buffer earmarked for primary device in the core phone with the display frame buffer associated with the detached primary device. A plurality of remote secondary devices can be paired with the core phone on request by said secondary devices to transfer an incoming call alert to said plurality of secondary devices and to establish a connection after authorization with said detached primary device.

The embodiments of the present invention provide a method for registering detachable primary device and a plurality of remote secondary devices with a core phone. The embodiments of the present invention provide a method for establishing a conference call between a primary device and a plurality of secondary devices through core phone. The embodiment of the present invention provides a method for using a multiuser application between a primary device and a plurality of secondary devices through core phone.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

DETAILED DESCRIPTION

Figure 1:
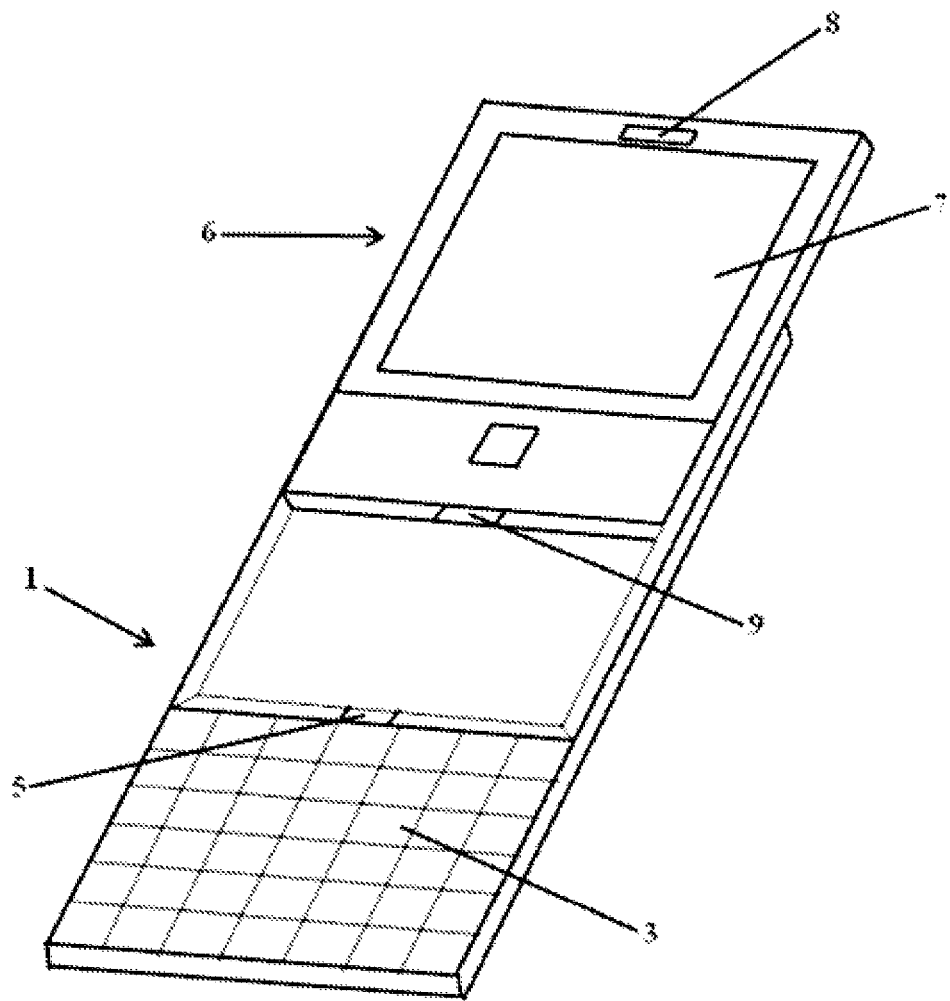
FIG. 1 shows a perspective view of a core phone with a detachable primary device, according to an embodiment of the present invention.

The following description is the full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to get an advantage without the corresponding use of other features described in the following paragraphs. As such, the present description should be considered as merely illustrative of the principles of the present technique and not in limitation thereof, since the present technique is defined solely by the claims.

Embodiments of the present invention provide a mobile device comprising a core phone 1 having a display unit 2, speaker 10, microphone 16, battery 11, microprocessor 12, memory 13, standard radio 15 and wireless access point. A primary device 6 is detachably connected to the core phone 1, said primary device 6 having a touch screen 7, speaker 17, microphone 22, battery 21, memory 18, microprocessor 20 and a wireless radio 19. The detached primary device 6 is authenticated for communicating with said core phone 1 through a wireless communication link. The core phone 1 transfers an incoming call alert to the paired detached primary device 6 by synchronizing the display frame buffer of the core phone 1 with the display frame buffer associated with the detached primary device 6. The core phone 1 sends the incoming call alert to said plurality of registered secondary devices and on receiving authorization from primary device 6 it establishes a connection with the secondary devices. The secondary device is a similar device like primary device 6 for receiving the display frame buffer from the core phone 1 after pairing with the core phone 1. The first detached touch screen paired with the core phone 1 will become primary device 6, and subsequently paired touch screens will become secondary device 6. Any device similar to primary device 6 paired may be paired with core phone 1 and will become primary device 6. The hardware of primary device 6 is same as that of the secondary device 6.

Embodiments of the present invention provide a method for registering detachable primary device 6 and a plurality of remote secondary devices with a core phone. The embodiments of the present invention provide a method for establishing a conference call between a detached primary device 6 and a plurality of detached secondary devices through core phone 1. The embodiment of the present invention provides a method for using a multiuser application between a primary device 6 and a plurality of secondary devices through core phone 1.

Figure 2:
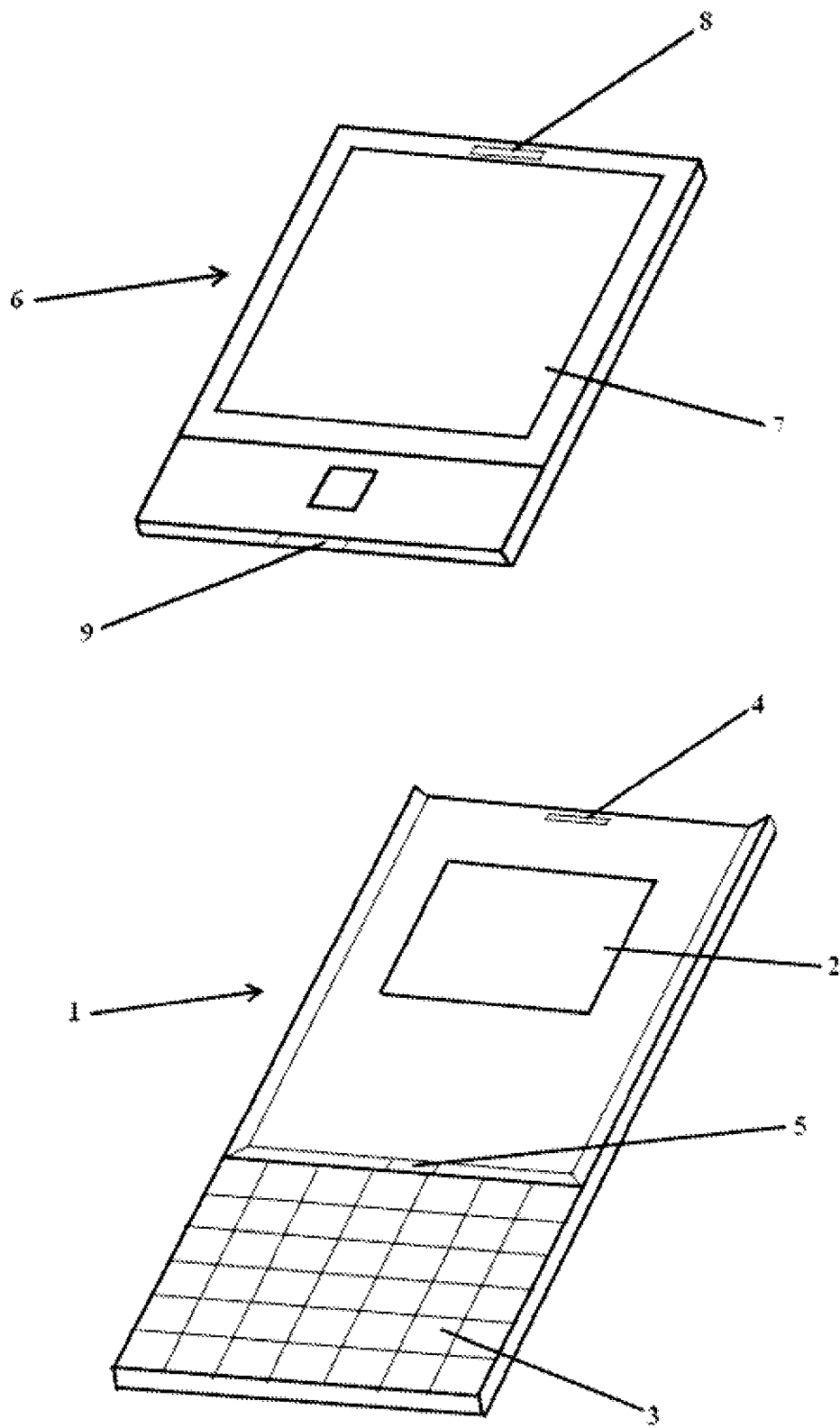
FIG. 2 shows a perspective view of a core phone with a detached primary device, according to an embodiment of the present invention.
Figure 3:
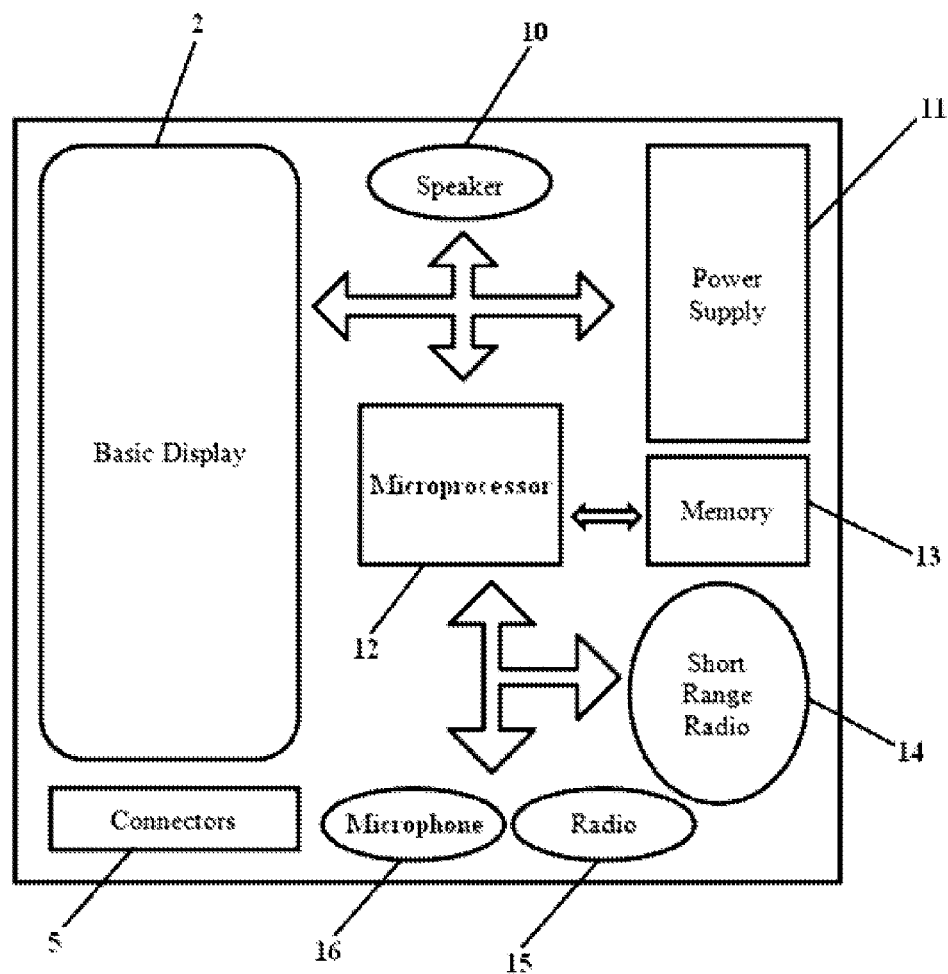
FIG. 3 shows a schematic diagram of a core phone, according to an embodiment of the present invention.
Figure 4:
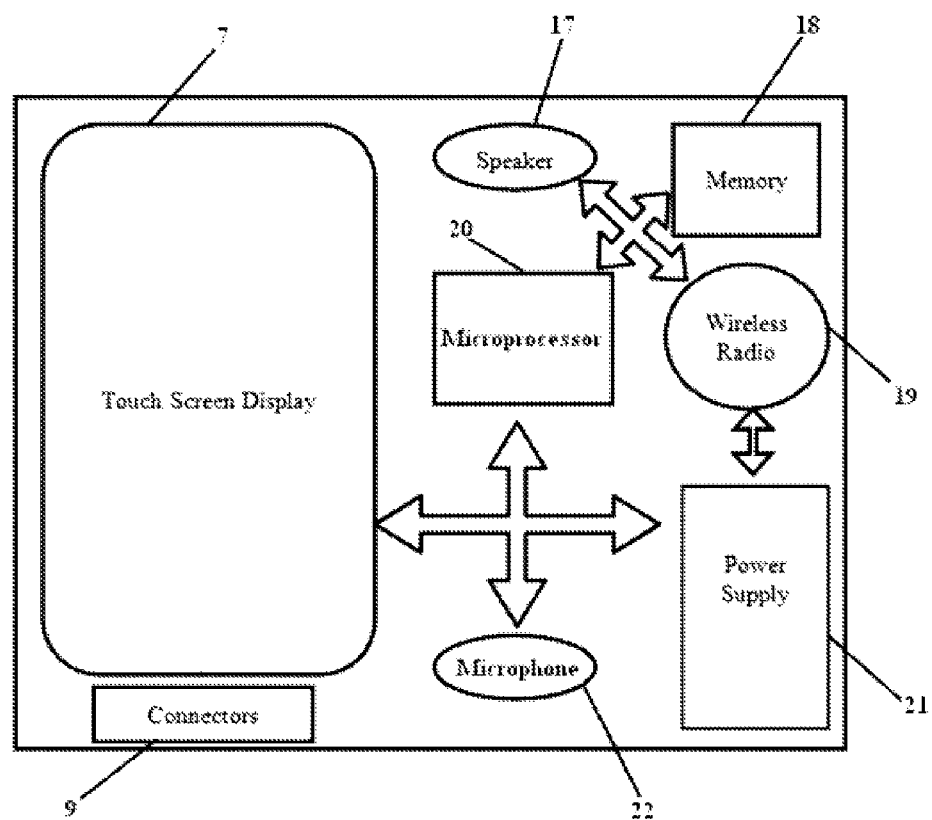
FIG. 4 shows a schematic diagram of a detachable primary device, according to an embodiment of the present invention.

A perspective view of the core phone 1 with detachable primary device 6, according to embodiment of the present invention is as shown in FIG. 1. A schematic diagram of the core phone 1 according to embodiment of the present invention is as shown in FIG. 3. The core phone 1 comprises a basic display unit 2, a speaker 4, microphone 16, power supply 11, microprocessor 12, memory 13, standard radio 15, connectors 5 and a wireless access point. A core phone with a detached primary device 6 is as shown in FIG. 2 and a schematic diagram of the detached primary device 6 is as shown in FIG. 4. The detachable primary device 6 according to present invention is a touch screen display unit 7.

The core phone 1 acts as a server and periodically sends "display frame buffer" to the paired detached primary devices 6 within the vicinity. The size of the frame buffer at server side depends on the capabilities of detached primary device 6 and core phone 1. An input from the detached primary device 6 is received by the core phone 1, and the core phone 1 updates the frame buffer accordingly. Either whole frame buffer is transmitted each time over the network, or only updated part of frame buffer is transmitted to the primary device 6. The wireless access point is provided in core phone for pairing with primary device 6 or compatible touch screen and to communicate with the primary device 6 using a reliable communication protocol like TCP/IP. The primary device 6 is connected or detached to core phone through connectors 9. The detached primary device 6 may be hinged, hooked or slidably connected to the core phone 1.

The core phone 1 includes a server running in it, any input from the detached primary device 6 will be received by the server and the server responds accordingly. The detachable primary device 6 or touch screen enables user to access smart phone functionality from remote location. A detachable primary device 6 has a touch screen display unit. A primary device once detached, communicates with core phone 1 by sending events corresponding to user's action on the touch screen. As the core phone 1 and the detached primary device 6 is in close proximity, the communication over the reliable protocol like TCP/IP will be fast enough to provide real-time experience.

The core phone microprocessor 12 maintains separate display frame buffer in the memory corresponding to the display of the primary device 6. The display frame buffer is maintained to synchronize the display of primary device 6 with the output of top of stack application such as "Call" or any other application running in the core phone 1. The detached primary device 6 sends input from the user to the core phone application as events, output from the application is updated in the display frame buffer of detachable device 6 through a wireless communication link from the display frame buffer associated with particular detachable device 6 in core phone 1.

Initially the core phone application keeps updating the display frame buffer which is synchronized with the display of the detached primary device 6, when the call application is brought on the top of the stack, it updates display frame buffer with the message about incoming call, when primary device's display frame buffer is synchronized, message about incoming call is displayed at detached primary device 6. Once call is accepted by detached primary device 6, the event of accepting call is forwarded to the "Call" application running in the core phone 1, then digitized audio of call is transmitted over short range radio between core phone 1 and primary device 6, detached primary device 6 uses its speaker and headphone to enable user to listen and speak in the ongoing call.

Figure 5:
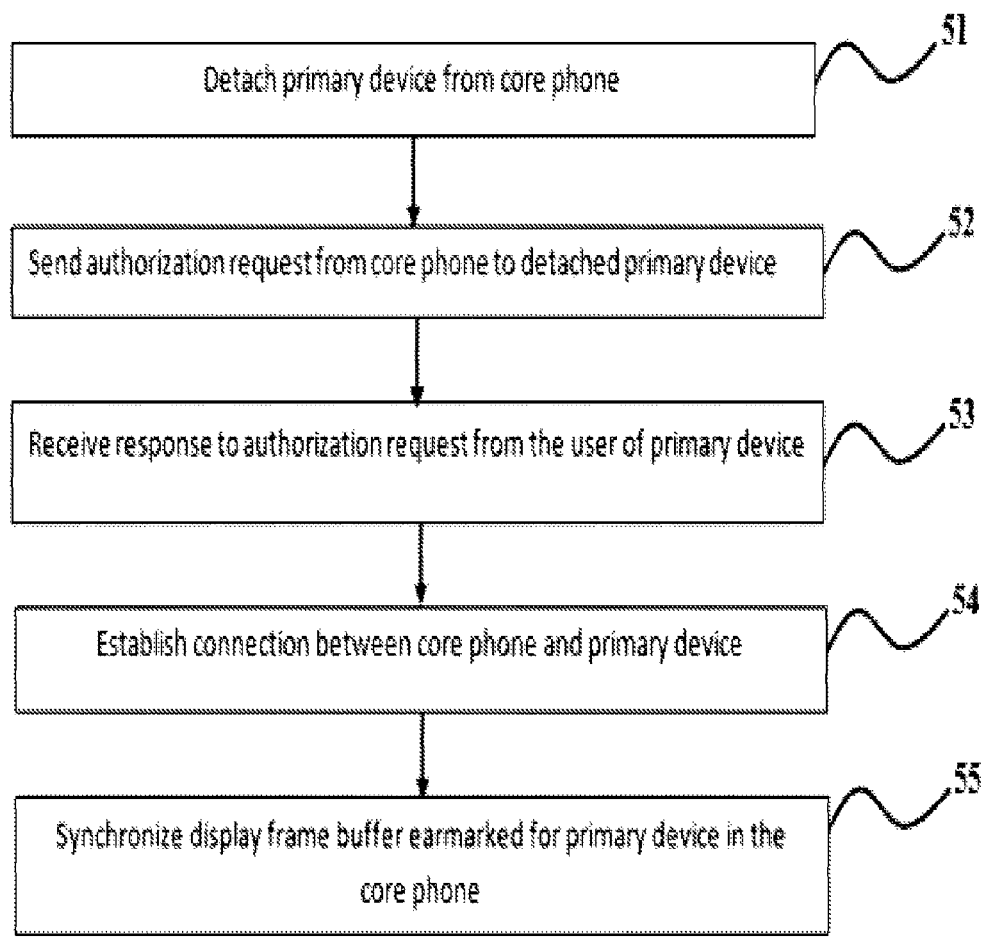
FIG. 5 shows a flow diagram to illustrate a registration sequence for registering detached primary device with a core phone, according to one embodiment of the present invention.

A method for registering detached primary device 6 or touch screen with a core phone 1 is shown in FIG. 5. The method comprises detaching the primary device from the core phone (51). The detached primary device is paired with the core phone 1 using TCP/IP authentication mechanism. A TCP/IP authorization request is sent from the core phone 1 to the detached primary device (52). The response to the TCP/IP request is provided by the user of the detached primary device 6. The response to TCP/IP authorization request is received by the core phone (53) to establish a connection whereby data can be transferred (54). The top of the stack of core phone application updates display frame buffer in core phone 1 associated with primary device 6 from time to time which is synchronized with the display frame buffer of primary device (55).

Figure 6:
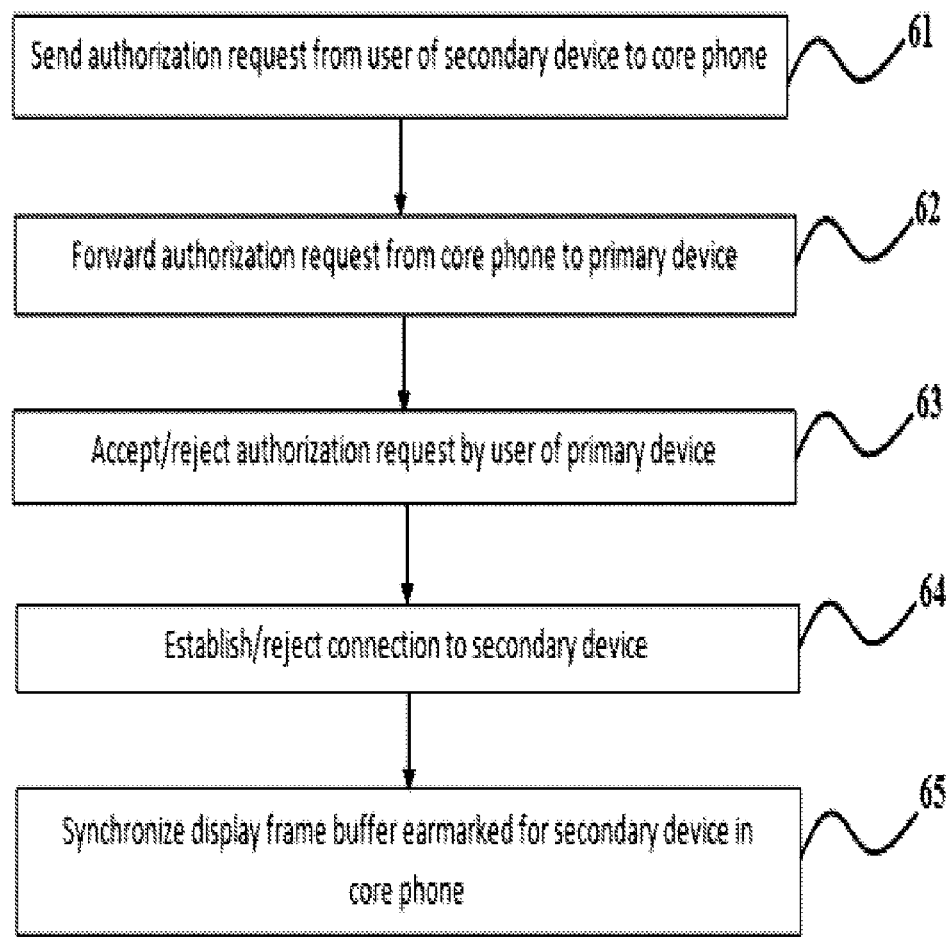
FIG. 6 shows a flow diagram to illustrate a registration sequence for registering a secondary device with a core phone, according to one embodiment of the present invention.

FIG. 6 shows an exemplary flow process for registering remote secondary devices with a core phone, according to embodiment of the present invention. The registration process comprises sending an authorization request to said core phone from users of said plurality of secondary devices for synchronizing display frame buffer of secondary devices with the display frame buffer of the core phone (61). For each secondary device the core phone maintains separate display frame buffer, the server running in core phone keeps track of which application corresponds to which secondary device. The authorization requests from the secondary devices are forwarded from the core phone to the registered primary device (62). An acceptance of or rejection to the authorization request is sent from the user of primary device to the core phone (63). A connection is established or rejected to said plurality of secondary devices (64) for synchronizing display frame buffer of secondary devices with the display frame buffer earmarked for secondary device in core phone based on the acceptance or rejection from the primary device (65). An incoming call may be communicated to the plurality of secondary devices similar manner as that of the primary device. Once participation call is authorized by detached primary device user of the secondary device can listen and speak in the ongoing call. The secondary device is similar device like primary device for receiving the display frame buffer from the core phone after pairing with the core phone. If one primary device is already registered with the core phone and another device is sending an authorization request to the core phone, then the requesting device is considered as a secondary device and needs approval from the primary device before it is successfully paired.

Figure 7:
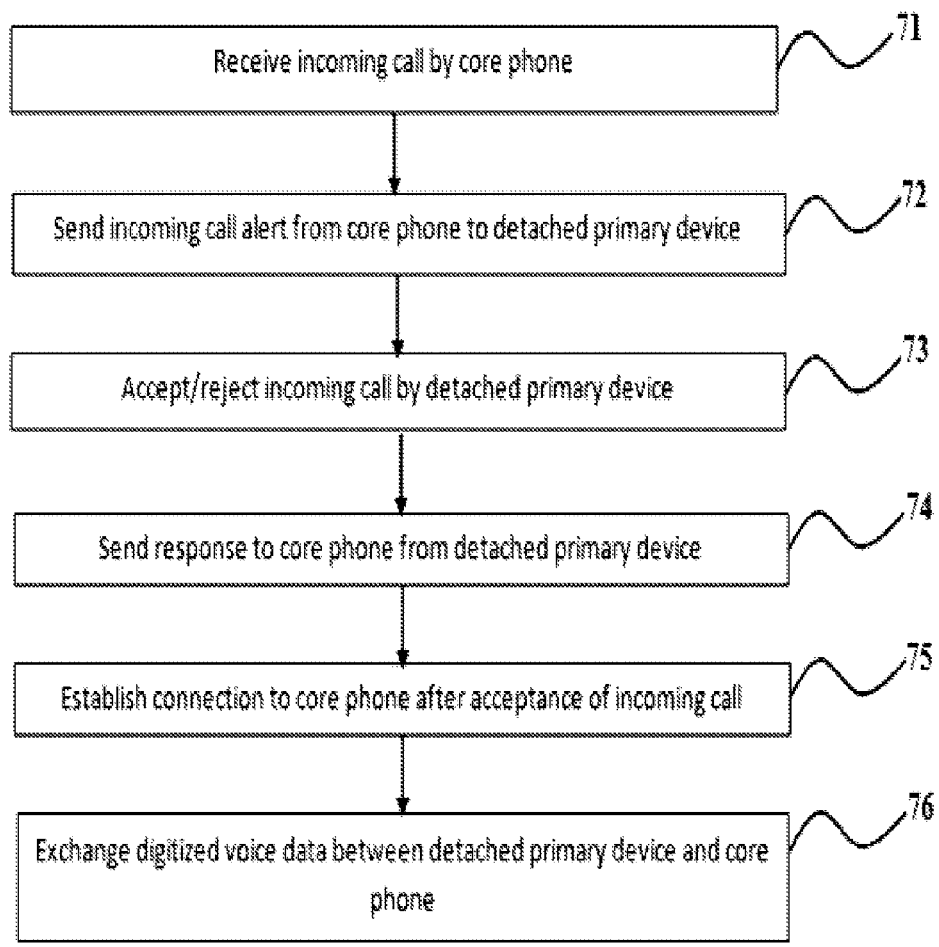
FIG. 7 shows a flow diagram to illustrate a sequence for receiving an incoming call by the detached primary device, according to an embodiment of the present invention.

FIG. 7 shows an exemplary flow diagram for receiving an incoming call by the detached primary device, according to embodiment of the present invention. Whenever a call is received by core phone using a standard communication (71) an alert is sent from core phone to the primary device (72), which is already paired with the core phone using a standard network protocol. The call may be accepted or rejected the call by the detached primary device (73), if the call is accepted, a response is sent back to the core phone (74), and a call is established (75). The voice data received from mobile network is digitized and is forwarded to primary touch screen by the core phone (76). The digitized voice data is exchanged between the core phone and the detached primary device after establishing a connection.

Figure 8:
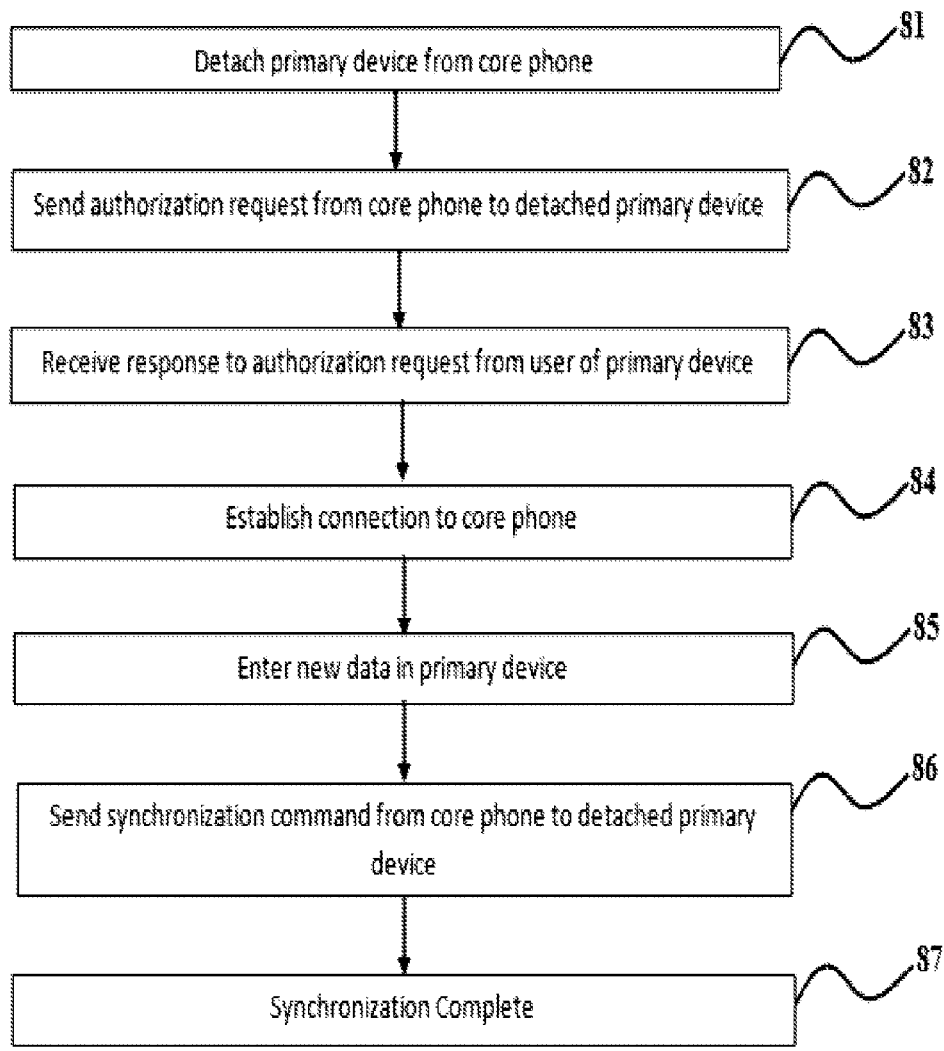
FIG. 8 shows a flow diagram to illustrate a sequence for synchronizing data between the core phone and the detached primary device, according to one embodiment of the present invention.

FIG. 8 shows a flow diagram for synchronizing data between the core phone and the detached primary device, according to one embodiment of the present invention. The core phone and detached primary device includes memory to store user data. As soon as the core phone is paired with the new primary device or some new data is entered in either core phone or touch screen, data is synchronized. The data synchronization can be manual or automatic. In case of manual synchronization, user has to explicitly initiate synchronization. In auto synchronization mode, each time user is prompted for synchronization in case of data modification or new registration of primary touch screen. The data synchronization comprises initially detaching primary device form core phone (81). Once the primary device is detached form the core phone an authorization request is sent by the core phone to primary device (82). User of the primary device enters the response to the authorization request, which is received by the core phone (83) to establish connection to primary device (84). When a new data is entered core phone or detached primary device a synchronization command is sent from the core phone to detached primary device (86). The synchronization command is accepted by the detached primary device to start the synchronization process to exchange the data between core phone and detached primary device asynchronously (87).

Figure 9:
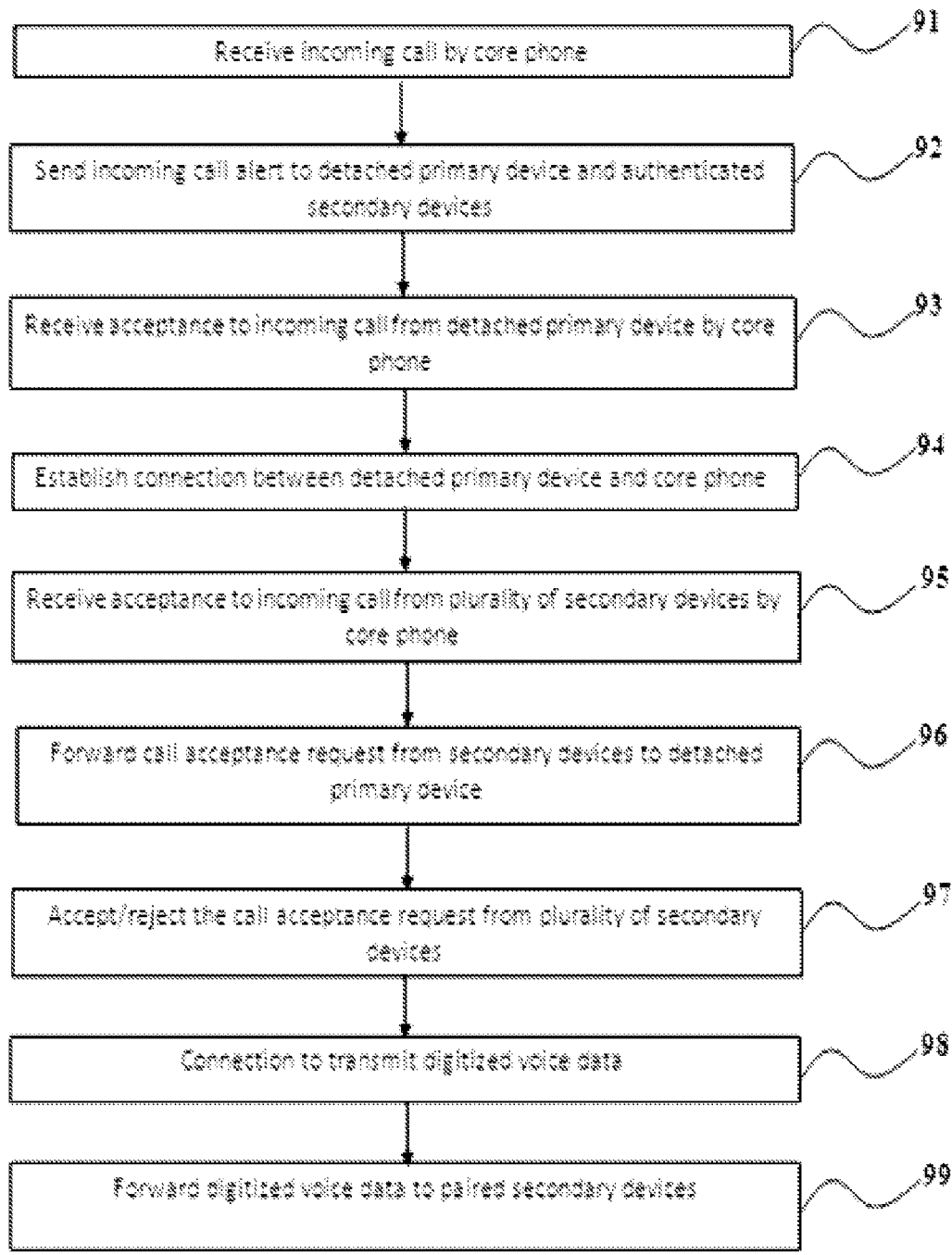
FIG. 9 shows a flow diagram to illustrate a sequence for establishing a conference call between the primary device and a plurality of secondary device through a core phone, according to one embodiment of the present invention.

FIG. 9 shows a flow diagram illustrating a sequence for establishing a conference call between the primary device, a plurality of secondary device and a core phone, according to one embodiment of the present invention. Initially an incoming call is received by core phone (91). An incoming call alert is sent from the core phone to detached primary device and plurality of authorized/authenticated secondary devices (92). The plurality of secondary device is authorized by sending an authorization request from secondary device user's to core phone. The core phone forwards the authorization request to the detached primary device. The acceptance is sent from the primary device to the core phone to establish a connection to the plurality secondary device. The incoming call is accepted by the primary device (93), thereby establishing a connection between the primary device and core phone (94). The call acceptance request from plurality of secondary devices is received by the core phone (95). The call request from the plurality of secondary devices is forwarded to primary device (96). The call request from the plurality of secondary devices is accepted by the primary device for establishing a connection over a common channel thereby (98). Once the connection is established the digitized voice data is forwarded to the secondary devices by the core phone (99). The primary device may accept or reject the call based on his preference to include or exclude the user of the secondary device in conference call.

Figure 10:
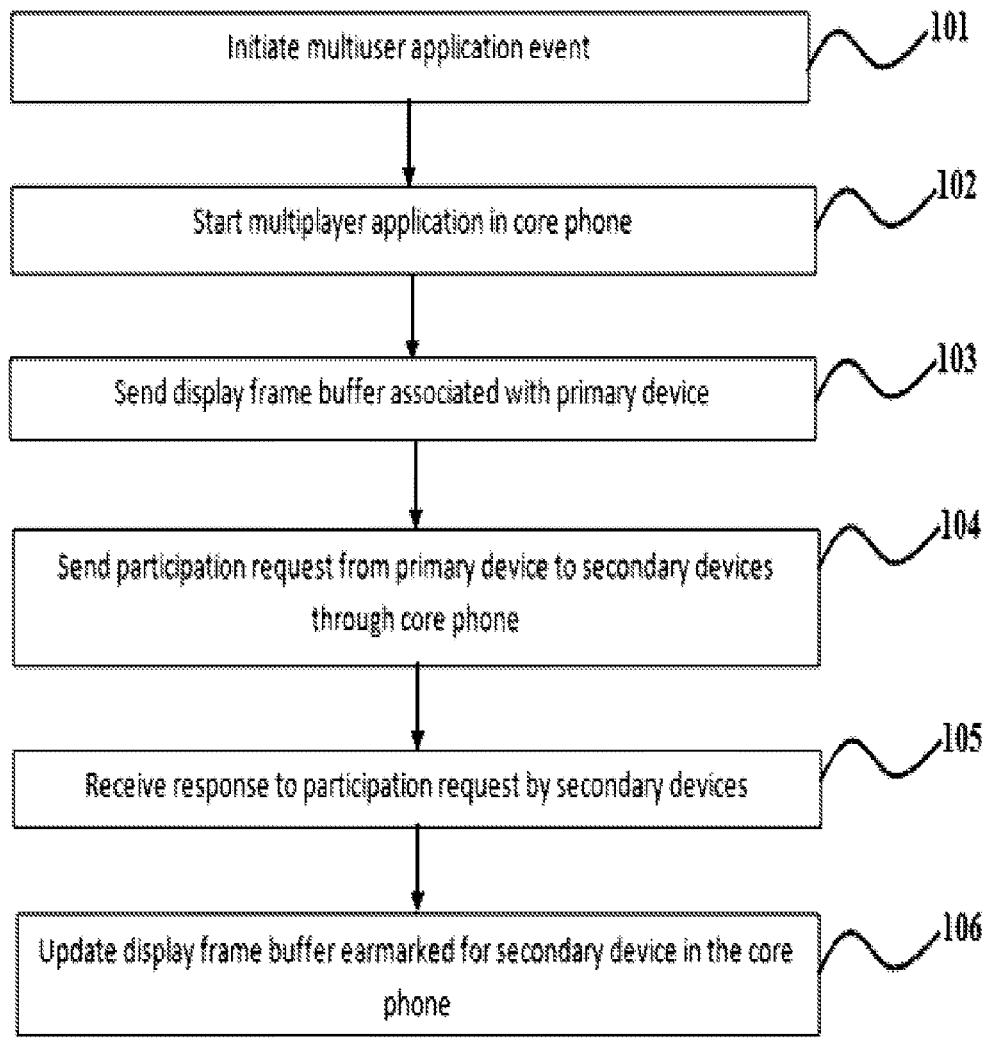
FIG. 10 shows a flow diagram to illustrate a sequence for establishing a multiuser application between detached primary device, plurality of secondary devices and a core phone, according to embodiment of the present invention.

FIG. 10 illustrates a sequence for using a multiuser application between primary device and plurality of secondary devices through a core phone, according to embodiment of the present invention. An "initiate multiuser application" event from the registered primary device is received by the core phone (101). The multiuser application is started in the core phone (102) for sending a display frame buffer associated with the primary device (103). A participation request may be sent from the primary device to a plurality of secondary devices through the core phone (104). The response to the participation request by the plurality of registered secondary device is received by the core phone (105) and the display frame buffers associated with the plurality of registered secondary devices is updated by the core phone (106). Each display frame buffer is synchronized with the corresponding device (primary/secondary)

Thus, the core phone with a detachable primary device is provided such that detachable primary device can be used by the user by pairing with the core phone when the core phone is not used directly but remains in the vicinity. Important data in the primary device is synchronized with the core phone to avoid the data loss when the primary device is accidentally dropped or lost or damaged. If user accidentally loses the detached primary device then all the important data and SIM card are still safe in core phone. With the availability of detachable primary device or touchscreen for cell phones, end user will have options among different vendors to select the touch screen independently from the core phone. User can carry the core phone in his pocket/purse and use separate touchscreen at home, office, car, etc. This liberates user from the need of carrying the mobile in hand, the user would never have to take out his core phone from table drawer or pocket/purse. User can even keep the core phone locked in his cupboard and carry the touchscreen, which will save the user from the effect of mobile phone radiation. It is convenient to carry the detachable primary device which is of light weight rather than carrying the whole phone.

User can configure the detached primary device with the core phone using a wireless communication protocol such as 802.11. User is provided with an option to use core cell phone without touchscreen if he/she requires just basic functionality of making calls. According to embodiment of the present invention multiple wireless touchscreens or remote devices with touchscreen may use single core phone at the same time. This ensures that multiple users can speak/listen using different input output component sets which are paired with same core phone. The detachable primary device can have minimal storage for data storage whereas the main data storage is in the core phone. The primary device can fetch required data on-demand from the core phone. The important data such as contact details are stored in both the core phone and the DIOC and synchronized periodically. If users lose either the core phone or DIOC component set, still the important data like contacts and other important application data are safe. The Core phone or the DIOC set can be upgraded independently. The primary device can also be physically attached with core phone to make it a single smartphone. Once the primary device is physically attached with core phone, the display, microphone, speaker and wireless access to core phone will be disabled automatically and touchscreen and the core phone starts working as a single integrated unit and detachable secondary devices can also be paired.

User is provided with an option to select the detachable primary device from different vendors as per their need. The primary device may include touchscreen of any type such as, resistive or capacitive or any other newer type of display with wireless connectivity and compatible with core phone. User is not required to depend on one specific vendor for buying the DIOC set, which results in cost reduction and flexibility. If users do not want to carry their touchscreen with them, since touchscreens are fragile and more vulnerable to temperature change as compared to other electronic components of phone, they can simply carry the core phone and operate it with different touchscreens at different places like inside office and home. Multiple users can participate in a conference call without using speakerphone by pairing multiple DIOCs to a single core phone. Multiple touchscreens can be paired with single core phone for gaming purpose. Multi-user applications can be run with the core phone as the execution console. The device is easy to use and maintain.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A mobile device, comprising;
    a core phone having a display unit, speaker, microphone, battery, microprocessor, memory, standard radio and wireless access point; and
    a primary device detachably connected to said core phone, said primary device having a display unit, speaker, microphone, battery, memory, microprocessor and a wireless radio, wherein:
        said detached primary device is authenticated for communicating with said core phone through a wireless communication link;
        said core phone transfers an incoming call alert to said detached primary device by synchronizing the display frame buffer of the core phone with the display frame buffer associated with the detached primary device;
        said detached primary device determines whether at least one secondary device is authorized to establish a connection with said core phone; and
        said core phone establishes a connection with, and transfers an incoming call alert to, the at least one secondary device based at least in part on the determination, by said detached primary device, that the at least one secondary device is authorized to establish a connection with said core phone.

2. The mobile device of claim 1, wherein when said primary device is an integral part of the core phone, the display unit of the core phone, the speaker of the core phone, and the microphone of the core phone are disabled, and the wireless communication between said primary device and the core phone stops.

3. The mobile device according to claim 1, wherein said detached primary device is registered with said core phone by pairing using a secure authentication key.

4. The mobile device according to claim 1, wherein said core phone is capable of making a phone call when said portable device is detached from said core phone.

5. The mobile device according to claim 1, wherein said detached primary device is configured to receive an incoming call via said core phone.

6. The mobile device according to claim 1, wherein said detachable primary device is customized with at least one of a resistive touchscreen or a capacitive touchscreen.

7. The mobile device according to claim 1, wherein data entered in the detached primary device is synchronized with the core phone, to store data in both the core phone and the primary device.

8. The mobile device according to claim 1, wherein data synchronization between the core phone and the primary device is done manually or automatically.

* * * * *